(12) United States Patent
Ekstrum et al.

(10) Patent No.: US 6,503,132 B2
(45) Date of Patent: Jan. 7, 2003

(54) HYBRID BURNISH/GLIDE HEAD WITH ADVANCED AIR BEARING FLY HEIGHT CONTROL RAILS

(75) Inventors: Robert P. Ekstrum, St. Paul, MN (US); William O. Liners, Minnetonka, MN (US); Mark J. Schaenzer, Eagan, MN (US); Laurie J. Schulz, Robinsdale, MN (US); Zuxuan Lin, Shakopee, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/873,710

(22) Filed: Jun. 4, 2001

(65) Prior Publication Data

US 2002/0039876 A1 Apr. 4, 2002

Related U.S. Application Data

(60) Provisional application No. 60/237,632, filed on Oct. 3, 2000.

(51) Int. Cl.⁷ .............................................. B24B 21/00
(52) U.S. Cl. ........................ 451/312; 451/317; 451/324
(58) Field of Search ............................... 451/41, 59, 63, 451/312, 313, 319, 5, 6, 324, 317; 29/90.01

(56) References Cited

U.S. PATENT DOCUMENTS

| 4,845,816 A | 7/1989 | Nanis |
| 5,063,712 A | 11/1991 | Hamilton et al. |
| 5,067,037 A | 11/1991 | Ananth et al. |
| 5,086,360 A | 2/1992 | Smith et al. |
| 5,200,867 A | 4/1993 | Albrecht et al. |
| 5,267,104 A | 11/1993 | Albrecht et al. |
| 5,431,592 A | 7/1995 | Nakata |
| 5,640,089 A | 6/1997 | Horikawa et al. |
| 5,658,191 A | 8/1997 | Brezoczky |
| 5,659,447 A | 8/1997 | Gregory et al. |
| 5,689,064 A | 11/1997 | Kennedy et al. |
| 5,708,540 A | 1/1998 | Ananth et al. |
| 5,782,680 A | 7/1998 | Pilsan |
| 5,825,181 A | 10/1998 | Schaenzer et al. |
| 5,841,608 A | 11/1998 | Kasamatsu et al. |
| 5,942,680 A | 8/1999 | Boutaghou |
| 5,980,369 A | 11/1999 | Burga et al. |
| 6,003,364 A | 12/1999 | Yao et al. |
| 6,040,958 A | 3/2000 | Yamamoto et al. |
| 6,230,380 B1 | 5/2001 | Wang et al. |
| 6,273,793 B1 * | 8/2001 | Liners et al. ................. 451/41 |

FOREIGN PATENT DOCUMENTS

| JP | 04315816 | 11/1992 |
| JP | 10134347 | 5/1998 |

* cited by examiner

Primary Examiner—George Nguyen
Assistant Examiner—Dung Van Nguyen
(74) Attorney, Agent, or Firm—Westman, Champlin & Kelly, P.A.

(57) ABSTRACT

A disc burnishing system configured to contact and level irregularities located on a surface of a disc is provided. The system includes a motor to rotate the disc and an armature. A slider is carried on the armature over the surface of the disc. The slider includes at least one raised air bearing rail disposed on and extending from a bottom surface that faces the disc. At least one burnish pad is disposed on the bottom surface and extends towards the disc. Each burnish pad is spaced apart from each raised air bearing rail. In accordance with one embodiment of the system, a defect detection apparatus is operably disposed relative the slider and is utilized to first detect an irregularity before it is burnished.

19 Claims, 7 Drawing Sheets

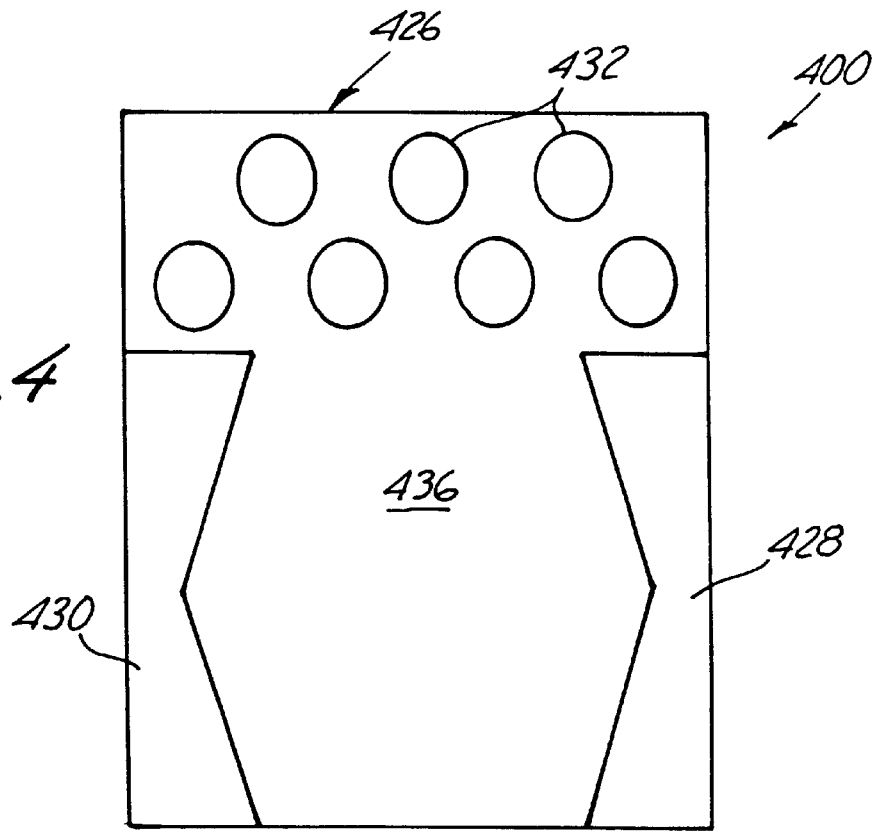
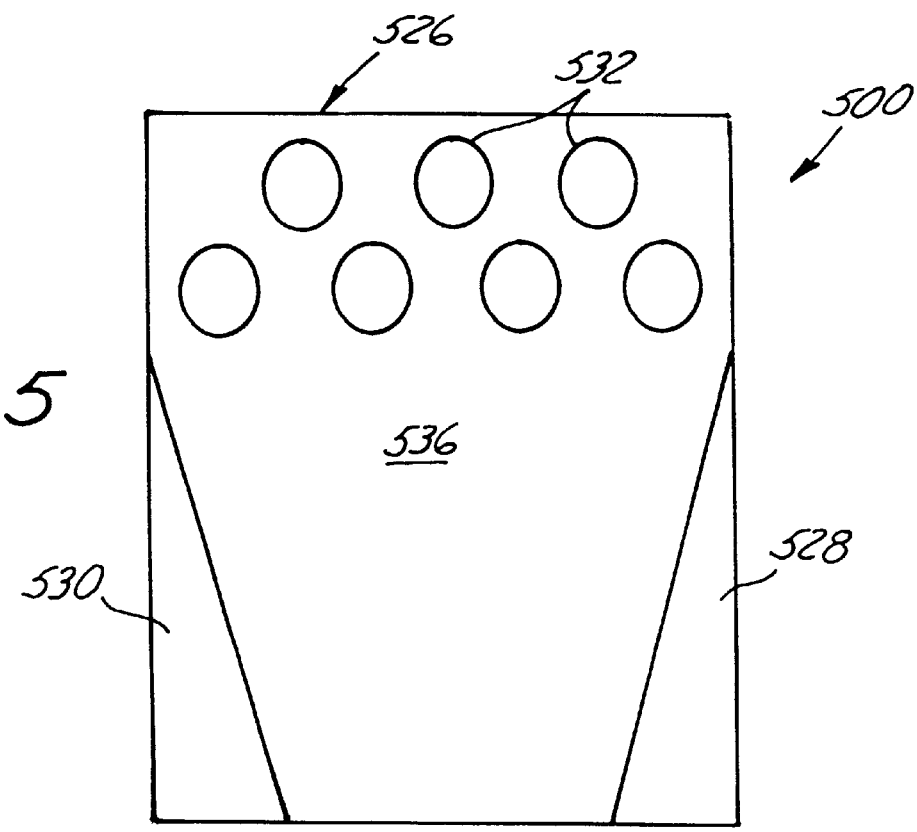

HYBRID BURNISH/GLIDE HEAD WITH ADVANCED AIR BEARING FLY HEIGHT CONTROL RAILS

CROSS-REFERENCE TO RELATED APPLICATIONS

This application is based on and claims the priority of an earlier filed co-pending U.S. provisional application Ser. No. 60/237,632, filed Oct. 3, 2000, entitled "HYBRID BURNISH/GLIDE HEAD ADVANCED AIR BEARING FLY HEIGHT CONTROL RAILS."

Reference is also made to co-pending U.S. patent application Ser. No. 09/112,954, filed Jul. 9, 1998, entitled "SLIDER FOR BURNISHING A DISC."

FIELD OF THE INVENTION

The present invention relates to disc drive systems. More specifically, the present invention relates to an apparatus for burnishing asperities or surface irregularities from the surface of a disc.

BACKGROUND OF THE INVENTION

In data processing systems, magnetic disc drives are often used as storage devices. In such devices, read/write heads located on a slider (or an air bearing) are used to write data on or read data from an adjacently rotating disc. The head is located either above or under the disc and isolated therefrom by a thin film of air. The thickness of the thin film of air depends on the disc's rotational speed and the shape of the air bearing surface. During drive operations, the fly height of the head continuously changes as the head pitches and rolls with the varying topography of the disc. If the quality of the disc or the read/write head is poor, occasional rubbing or sharp contact may occur between the disc and the head. Such contact may damage the head or the disc, which can cause a loss of valuable data.

To efficiently accommodate changes in disc data storage characteristics (i.e., ever-narrowing recording track widths and increases in linear magnetic recording density), the head fly height (or slider clearance) is progressively being decreased. These decreases in fly height can cause the contact frequency between disc and head to increase. To prevent damage to either the disc or head for such low slider clearance, it has been recognized that the surface of the disc should be very flat and free of bumps. Current constraints for maximum defect height are on the order of 0.5 $\mu$in. Future designs, already on the horizon, will require roughness less than 0.5 $\mu$in.

One procedure that has been used to flatten disc surfaces is a two step glide/burnish process. Within such a process, a glide head is first flown over the disc surface to detect and record asperities high enough to potentially strike a flying read/write head and cause data errors or head crashes. The glide head typically includes an advanced air bearing (AAB) surface designed to enable a particularly low fly height that is lower than most read/write heads fly during normal conditions.

After the glide step is completed, a burnish sweep is performed to remove recorded asperities. The burnish sweep consists of actually contacting the asperities with burnish pads located on an air bearing surface of a flying burnish head, thereby leveling the hits to a desired specification. The glide and burnish steps can be repeated to insure all asperities have been properly reduced or removed.

Traditionally, the burnish head does not include an AAB surface design, resulting in large variances in fly height. Variations in the burnish step can ultimately lead to a decrease in data yield efficiency. However, a burnish head that includes a complex AAB surface and an inefficient configuration of burnish pads can also lead to yield loss.

Because of the tight fly control required for the glide process and the flight variation typical to the burnish head air bearing surface, the traditional burnish head is not suitable to also be used as a glide head. Thus, the glide/burnish process has relied on a lengthy two head process. Each switch between the glide and burnish steps requires use of a separate head.

The present invention provides a solution to this and other problems and offers advantages over the prior art.

SUMMARY OF THE INVENTION

The present invention relates to data storage device manufacturing systems that include a hybrid burnish/glide head with advanced air bearing fly height control rails that address the above-mentioned problems.

In accordance with one aspect of the present invention, a disc burnishing system configured to contact and level irregularities located on a surface of a disc is provided. The system includes a motor to rotate the disc at a desired rate and an armature that carries a burnish slider over the surface of the disc. The slider includes at least one raised air bearing rail disposed on and extending from a bottom surface that faces the disc. At least one burnish pad is disposed on the bottom surface and extends towards the disc. Each burnish pad is spaced apart from each raised air bearing rail. In accordance with one embodiment of the system, a defect detection apparatus is operably disposed relative the burnish slider and is utilized to first detect an irregularity before it is burnished.

In accordance with another aspect of the present invention, a burnishing air bearing slider is provided. The slider includes a slider body having an upper surface and a bottom surface opposed to the upper surface. The bottom surface includes a length, a longitudinal axis, a leading edge and a trailing edge. First and second rails are disposed on and extend from the bottom surface and are substantially symmetrical in their position relative the longitudinal axis. Each rail includes a rail trailing end offset from the trailing edge of the bottom surface and a rail leading end that substantially coincides with the leading edge of the bottom surface. The rails provide an aerodynamic lift to the slider body in response to air flow under the slider. A plurality of burnish pads are attached to the bottom surface and positioned along the length of the bottom surface, proximate the trailing edge thereof. The trailing edge of the bottom surface corresponds to a distal end of the slider and the leading edge corresponds to a proximal end of the slider. Accordingly, the burnish pads are positioned in a plurality of locations that are substantially distal in location relative the rail trailing ends. In accordance with one embodiment, a defect detection apparatus is operably disposed relative the slider and enables detection of disc surface irregularities.

These and various other features, as well as advantages that characterize the present invention, will be apparent upon a reading of the following detailed description and review of the associated drawings.

BRIEF DESCRIPTION OF THE DRAWINGS

FIG. 4 is bottom plan view of a burnishing air bearing slider in accordance with another embodiment of the present invention.

FIG. 5 is a bottom plan view of a burnishing air bearing slider in accordance with another embodiment of the present invention.

DETAILED DESCRIPTION OF ILLUSTRATIVE EMBODIMENTS

Figure 1:
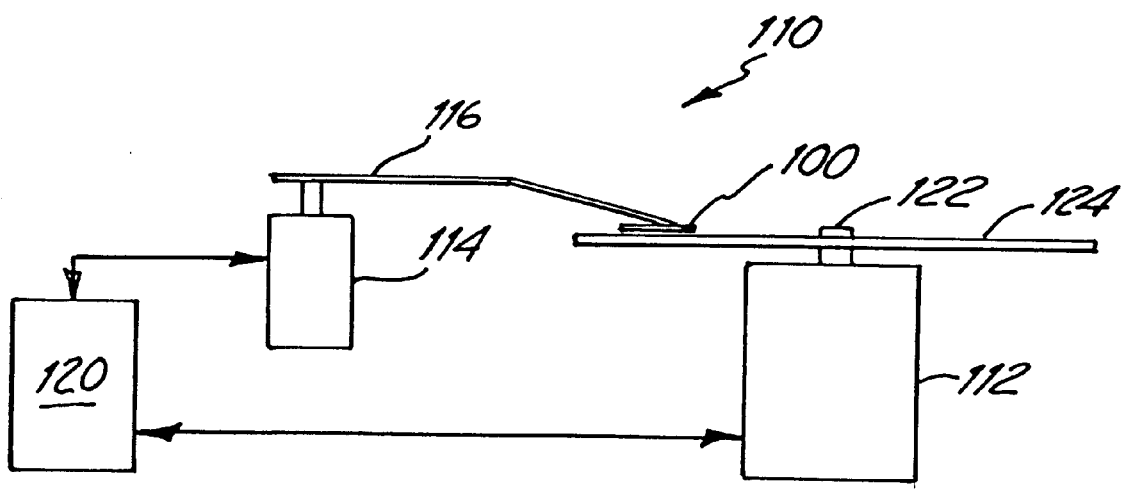
FIG. 1 is a block diagram of an apparatus for burnishing a disc surface in accordance with the present invention.

Referring now to FIG. 1, a block diagram of disc burnishing system 110 within which the present invention is particularly useful is shown. System 110 includes spindle motor 112, actuator 114, suspension assembly 116, burnishing slider 100 and controller 120.

Spindle motor 112 is operably coupled to controller 120 and includes spindle 122, which detachably couples to a disc 124. Upon energization, spindle motor 112 causes spindle 122 and disc 124 to rotate. Suspension assembly 116 suspends burnishing slider 100 above disc 124. Suspension assembly 116 is coupled to actuator 114 such that, upon energization of actuator 114, suspension assembly 116 causes burnishing slider 100 to move over the surface of disc 124. When disc 124 rotates, burnishing slider 100 will fly above disc 124 on a small film of air (air bearing).

The height at which burnishing slider 100 flies over disc 124 is controlled by various factors, including the pre-load force of suspension assembly 116, the aerodynamic characteristics of burnishing slider 100, and the rotational speed of disc 124. Varying these parameters will vary the fly height of burnishing slider 100 over disc 124. Controller 120 is coupled to actuator 114 and spindle motor 112. Thus, by varying the energization signal to actuator 114, controller 120 is able to control the location of burnishing slider 100 over disc 124. And, by varying the energization signal to spindle motor 112, controller 120 is able to control the fly height of burnishing slider 100 over disc 124.

Traditionally, burnishing sliders similar to slider 100 have not included fly sensitive advanced air bearing surface (AAB) designs, resulting in large variances in fly height. Traditional burnish heads have been designed to operate at avalanche, the speed at which the slider 100 initiates contact with disc 124. Typically, the avalanche speed varies greatly due to poor aerodynamic characteristics of traditional burnishing sliders and due to manufacturing inconsistencies therein.

The traditional burnish process has operated based on an imprecise average avalanche speed. Such poorly controlled flight of a burnish head can cause damage to the surface of disc 124 and can subsequently lead to data yield loss. For instance, when a burnishing slider comes in contact with a smooth disc surface, the disc surface may be damaged by high friction due to adhesion. Also, many disc surfaces include a thin film that can come in prolonged contact with a burnishing slider having inconsistent flight characteristics, causing static friction damage due to the meniscus forces of the absorbed films at the interface.

Figure 2:
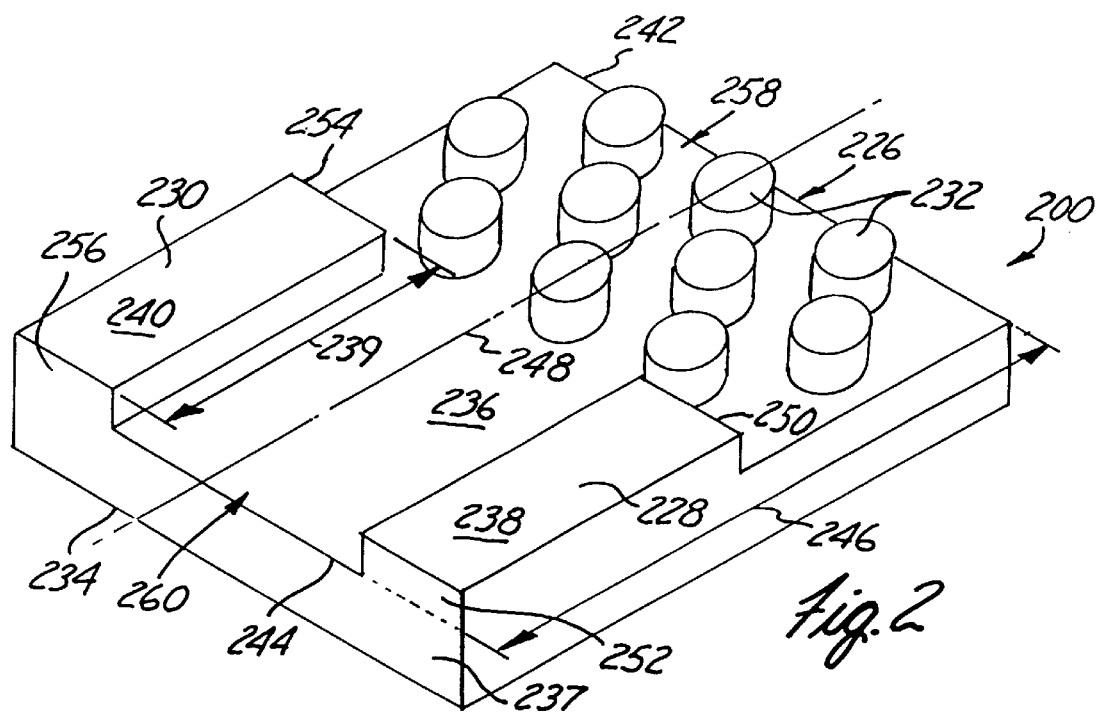
FIG. 2 is a bottom perspective view of a burnishing air bearing slider in accordance with an embodiment of the present invention.

Referring now to FIG. 2, a bottom perspective view of a burnishing slider 200 in accordance with an embodiment of the present invention is shown. Burnishing slider 200 is illustratively designed to operate within a disc burnishing system in a manner similar to the operation of burnishing slider 100 within system 110 in FIG. 1. Burnishing slider 200 includes an AAB surface that is designed to minimize the disadvantages of traditional burnishing sliders by enabling the effective burnishing of disc surface irregularities at a consistent and controlled low fly height.

Burnishing slider 200 includes a body 226, which further includes an upper surface 234, bottom surface 236 and a leading end 237. Bottom surface 236 includes a trailing edge 242, a leading edge 244, a length 246 and a longitudinal axis 248. Trailing edge 242 corresponds to a distal end 258 of burnishing slider 200 and leading edge 244 corresponds to a proximal end 260 thereof.

A first rail 228 and a second rail 230 having a length 239 are disposed on and extend from bottom surface 236 of body 226. The rails are illustratively substantially symmetrical in their position relative longitudinal axis 248. First rail 228 includes a first rail air bearing surface 238, a rail trailing end 250 and a rail leading end 252. Second rail 230 includes a second rail air bearing surface 240, a rail trailing end 254 and a rail leading end 256. Rail trailing ends 250 and 254 are offset from trailing edge 242 of bottom surface 236. Rail leading ends 252 and 256 substantially coincide with leading edge 244 and leading end 237.

It should be noted that, in accordance with the present invention, raised air bearing portions other than rails could be substituted for first and second rails 228 and 230. In addition, it should be noted that rails 228 and 230 could be shaped different than their illustration in FIG. 2. For instance, rail ends 250, 252, 254 and 256 might include aerodynamic rounded edges, rather than the illustrated abrupt edges. In accordance with the present invention, all raised air bearing portions, including rails 228 and 230, could be incorporated into bottom surface 236 using photolithographic technology and ion etching techniques known in the art.

Burnish pads 232 are illustratively disposed on and extend from bottom surface 236 proximate trailing edge 242. The burnish pads 232 are positioned alone length 246 of bottom surface 236 in locations that are substantially distal in location relative rail trailing ends 250 and 254. Burnish pads 232 are spaced apart from first and second rails 228 and 230. It should be noted that while burnish pads 232 and rails 228 and 230 are illustrated as being substantially symmetrical in position relative longitudinal axis 248, the present invention may be practiced with non-symmetric designs.

Those skilled in the art will appreciate that first rail 228, second rail 230, leading end 237, and rail leading ends 252 and 256 are shaped to create a negative air pressure in areas between first rail 228 and second rail 230. This negative air pressure is capable of drawing slider 200 closer to the surface of disc 124 (FIG. 1) relative to the speed at which disc 124 spins. Although described with respect to a negative air pressure air bearing, the present invention may be practiced with any air bearing.

Those skilled in the art will appreciate that slider 200 is designed to fly at a pitch angle, wherein distal end 258 flies closer to the surface of disc 124 than proximal end 260. Generally, the precise angle of slider pitch is dependent upon several factors including but not limited to the aerodynamic features of the slider and air bearing surface, the rotation speed of the disc over which the slider flies, and the particular attachment characteristics or load point of the slider relative the suspension assembly.

In accordance with embodiments of the present invention, burnish pads 232 extend from bottom surface 236 for a distance that is slightly further or slightly less than a plane corresponding to rail air bearing surfaces 238 and 240. In accordance with another embodiment, burnish pads 232 extend only so far as to be in the same plane as rail air bearing surfaces 238 and 240. Which extension level of burnish pads 232 is most appropriate is dependent upon, among other factors, a desired disc rotation speed, the particular aerodynamic characteristics of the associated slider, and the characteristics of the media or disc over which the slider is designed to fly. In other words, the extension level of burnish pads 232 is application specific.

Generally, the extension level of burnish pads 232 should be selected such that, during flight of the burnishing slider 200, burnish pads 232 are positioned nearest disc 124 and thus generally are the only locations that make physical contact with the surface of disc 124. Consideration should be given to the fact that slider 200, as described above, is designed to fly at a pitch angle with distal end 258 closer to the surface of disc 124 (FIG. 1) than proximal end 260.

As will be described in relation to other embodiments, in accordance with the present invention, the precise configuration of the components of the burnishing slider described in relation to FIG. 2 can be tailored for specific burnish applications. Again, for most burnish purposes, the ideal fly attitude is with a positive pitch (leading edge higher) and a flat roll (side to side). For modem and future disc surfaces, the burnish pads should be capable of flying at a stable fly height below 0.5 $\mu$in. The embodiments of the present invention are capable of fulfilling these criteria for a variety of burnish applications.

Figure 3:
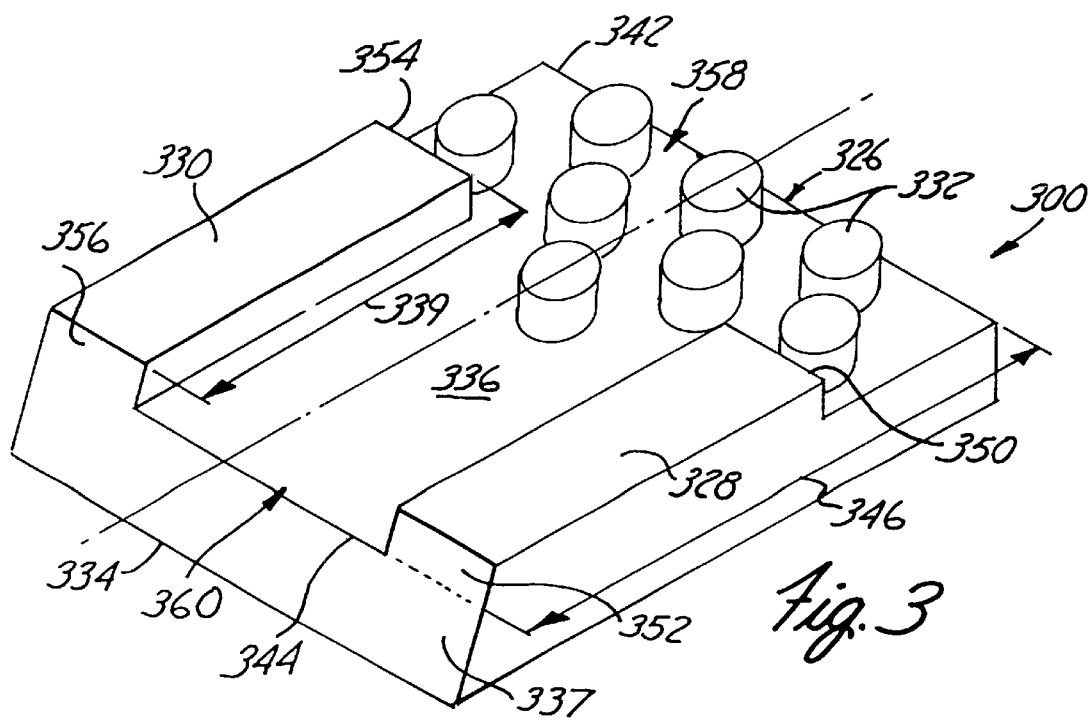
FIG. 3 is a bottom perspective view of a burnishing air bearing slider in accordance with another embodiment of the present invention.

Referring now to FIG. 3, a bottom perspective view of a burnishing slider 300 in accordance with another embodiment of the present invention is shown. Similar reference numbers are used in FIG. 3 for elements that are the same or similar to those elements illustrated in previously described embodiments. Burnishing slider 300 is illustratively designed to operate within a disc burnishing system in a manner similar to the operation of burnishing slider 100 within system 110, described in reference to FIG. 1, and similar to the operation of slider 200 described in reference to FIG. 2.

Burnishing slider 300 is intended to illustrate how, in accordance with the present invention, the precise configuration of the components of burnishing slider 200, described in relation to FIG. 2, can be tailored to achieve desired slider flight characteristics for a particular burnish application.

Burnishing slider 300 (FIG. 3) includes several features that are specifically different than the features of burnishing slider 200 (FIG. 2). For instance, burnishing slider 300 includes first and second rails 328 and 330 that include a length 339 that is greater than length 239 of rails 228 and 230, attached to burnishing slider 200. Further, burnishing slider 300 includes burnish pads 332 that are arranged in a configuration different than the arrangement of burnish pads 232, extending from burnishing slider 200. Within the FIG. 3 pad configuration, one burnish pad 332 is even positioned in a location that is proximally located relative rail trailing ends 350 and 354. Such a configuration is within the scope of the present invention. The locations of burnish pads 332, generally, however, are positioned along length 346 of bottom surface 336 and are still substantially distal in location relative the rail trailing ends 350 and 354. Finally, body 326 includes a tapered leading end 337. Rail leading ends 352 and 356 are similarly tapered so as to be substantially flush with leading end 337.

In accordance with the present invention, different burnish pad sizes, heights and configurations, different slider body shapes (i.e., different leading edge tapers), and different rail lengths, heights and widths can be selected in order to achieve desired slider flight characteristics for a particular burnish application. In addition, fly height can be controlled by varying, in combination, both the process speed (disc rotation speed) and the described and other slider element dimensions and configurations. Accordingly, a burnishing slider for a particular burnish application (i.e., a particular media or disc surface) can be designed so as to optimize fly speed sensitivity such that a given burnish process is highly repeatable and reproducible. Burnishing slider 200 and burnishing slider 300 should only be considered examples of the many potential configurations within the scope of the present invention.

In addition to adjusting rail lengths, heights and widths, the shape of the rails can also be adjusted to achieve desired burnishing slider flight characteristics. FIG. 4 is a bottom plan view of a burnish air bearing slider 400 in accordance with an embodiment of the present invention. Similar reference numbers are used in FIG. 4 for elements that are the same or similar to those elements illustrated in previously described embodiments. Burnishing slider 400 is illustratively designed to operate within a disc burnishing system in a manner similar to the operation of burnishing slider 100 within system 110, described in relation to FIG. 1, and similar to the operation of previously described slider embodiments. Within FIG. 4, first rail 428 and second rail 430 illustratively include a double-tapered shape. Such a rail shape could be utilized in order to obtain desired slider flight characteristics.

Referring now to FIG. 5, a bottom plan view of a burnish air bearing slider 500 in accordance with an embodiment of the present invention is shown. Similar reference numbers are used in FIG. 5 for elements that are the same or similar to those elements illustrated in previously described embodiments. Burnishing slider 500 is illustratively designed to operate within a disc burnishing system in a manner similar to the operation of burnishing slider 100 within system 110, described in relation to FIG. 1, and similar to the operation of previously described slider embodiments. Within FIG. 5, first rail 528 and second rail 530 illustratively include single-tapered shape. Such a rail shape could be utilized in order to obtain desired slider flight characteristics.

The shapes of rails 428, 430, 528 and 530 are only intended to serve as examples. Other rail shapes could be utilized to obtain desired flight characteristics without departing from the scope of the present invention. In accordance with one embodiment, slider surfaces, for example surfaces 438 and 440 (FIG. 4) or surfaces 238 and 240 (FIG. 2), could be tapered to obtain a desired flight characteristic.

In accordance with the present invention, in addition to adjusting the size, height and configuration of the previously described burnish pads, the shape of the pads could also be adjusted to achieve desired burnish and flight characteristics. For example, a particular shape for a burnish pad might be selected based on how aggressive the burnish head is designed to be in terms of the removal of disc surface irregularities.

Figure 6:
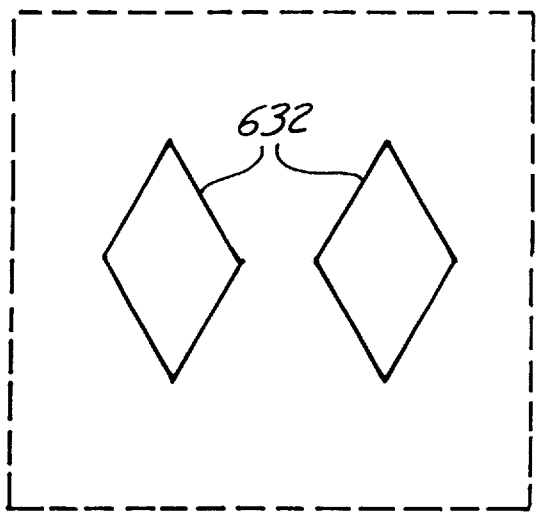
FIG. 6 is a bottom plan view of a burnish pad in accordance with an embodiment of the present invention.

Referring now to FIG. 6, a bottom plan view of diamond shaped burnish pads 632 is shown. Such burnish pads might be selected for incorporation into the above-described burnishing slider embodiments. The diamond shaped pads might be selected for their tendency to be both aerodynamic and somewhat aggressive in their removal of disc surface irregularities.

Figure 7:
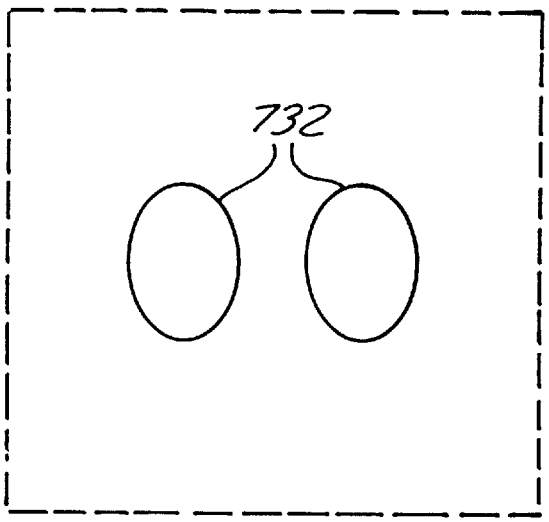
FIG. 7 is a bottom plan view of a burnish pad in accordance with another embodiment of the present invention.

Referring now to FIG. 7, a bottom plan view of ellipse shaped burnish pads 732 is shown. Such burnish pads might be selected for incorporation into the above-described burnishing slider embodiments. The ellipse shaped pads might be selected for their tendency to be particularly effective in cutting or removing defects, making them a more aggressive option.

Figure 8:
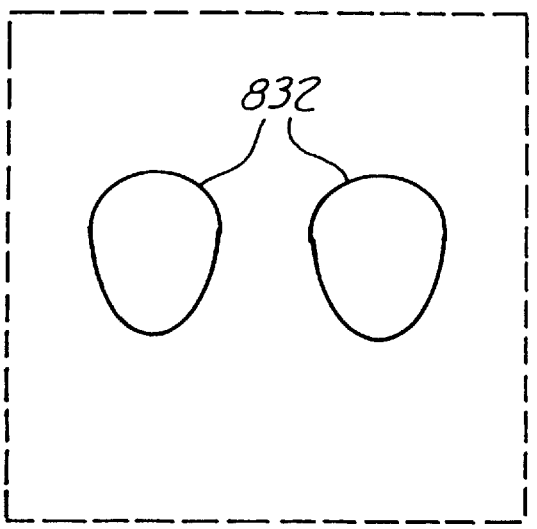
FIG. 8 is a bottom plan view of a burnish pad in accordance with another embodiment of the present invention.

Referring now to FIG. 8, a bottom plan view of tear drop shaped burnish pads 832 is shown. Such burnish pads might be selected for incorporation into the above-described burnishing slider embodiments. The tear drop shaped pads might be selected for their tendency to be particularly aerodynamic, a characteristic that might be advantageous for high speed applications. The tear drop shape would be a less aggressive option.

Figure 9:
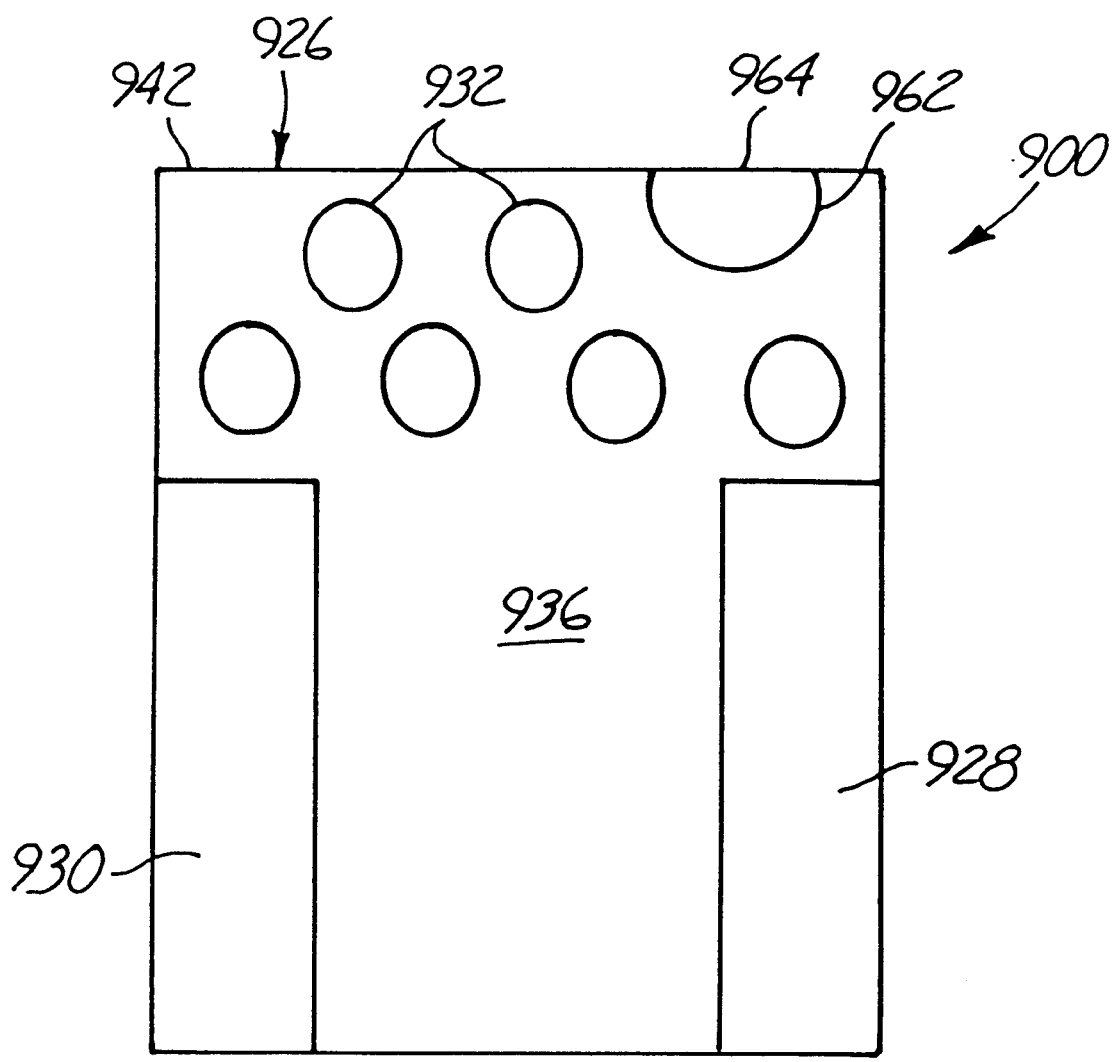
FIG. 9 is a bottom plan view of a hybrid burnishing/gliding air bearing slider in accordance with an embodiment of the present invention.

Referring now to FIG. 9, a bottom plan view of a hybrid burnishing/gliding air bearing slider 900 in accordance with another embodiment of the present invention is shown. Similar reference numbers are used in FIG. 9 for elements that are the same or similar to those elements illustrated in previously described embodiments. Hybrid slider 900 is illustratively designed to operate within a disc burnishing system in a manner similar to the operation of burnishing slider 100 within system 110, described in reference to FIG. 1, and similar to the operation of sliders described in previous embodiments.

Hybrid slider 900 consolidates features of a glide slider and features of a burnish slider into a single slider head, thus enabling a consolidation of the burnish/glide process. The glide process requires tightly controlled fly heights and thus cannot be carried out using a traditional burnish head. Consolidation of burnish and glide features requires a burnish device having tight flight control capability, such as a burnish device having advanced aerodynamic characteristics, similar to the burnish sliders described above in previous embodiments of the present invention.

Hybrid slider 900 is similar to the burnish devices described in previous embodiments, but, in contrast to previously described embodiments, hybrid slider 900 includes a glide sensor 962 for detecting and making a record of defects on the surface of a disc. In accordance with one embodiment, glide sensor 962 is a piezoelectric sensor pad. Glide sensor 962 is disposed on a bottom surface 936 and extends therefrom. Glide sensor 962 is operably connected to slider 900 and illustratively to a burnishing system, such as system 110 (FIG. 1). For example, glide slider 962 could be operably connected to controller 120, which could include means for recording sensed defect information and means for controlling in accordance therewith.

While the shape of glide sensor 962 can be tailored to different glide/burnish applications, an example of one possible shape is illustrated in FIG. 9. The illustrated glide sensor 962 includes a substantially flat portion 964 that is positioned substantially flush with trailing edge 942 of bottom surface 936.

In accordance with one embodiment of the present invention, slider 900 is designed with aerodynamic characteristics that enable the slider to fly at a "glide speed" over the surface of a disc, such that glide sensor 962 is the lowest point extended and the only portion of slider 900 that contacts the surface of disc 124 (FIG. 1). Accordingly, glide sensor 962 is used to detect defects on the disc surface. Once the defects have been detected, the speed (i.e., rotation of the disc) is reduced to "burnish speed" such that the fly height is reduced and burnishing pads 932 come into contact with the defects, thereby leveling or removing the defects. In accordance with one embodiment, switches between the glide speed and burnish speed are repeated until all desired defects have been detected and burnished appropriately. This process eliminates the need for two separate glide and burnish heads, thereby reducing process time.

In accordance with one embodiment, glide sensor 962, burnish pads 932 and rails 928 and 930 all extend from bottom surface 936 for an equal distance. In accordance with other embodiments, at least one of these elements extends to a level different than the others. The precise level of extension for each element is dependent upon, among other factors, a desired disc rotation speed (process speed), upon characteristics of the subject media or disc, upon the attachment characteristics between slider 900 and an associated suspension, and upon the specific aerodynamic characteristics of the particular slider 900. In other words, the extension level of the elements disposed on and extending from surface 936 is application specific.

Detection of defects on a surface of disc 124 (FIG. 1) can be performed using at least two types of glide tests: contact and non-contact. Contact detection involves physical head-disc interaction, wherein "hits" are reported, for example, as high voltage spikes sensed by a piezoelectric sensor. This type of detection is consistent with the detection associated with sensor 962 described above.

Non-contact detection records the presence of defects without touching the defect or the associated disc surface. Non-contact detection, for example, might involve the recording of disc surface defects in the form of glide noise that occurs when slider 100 flies over disc 124 without making contact therewith. This type of defect detection assumes that eddy currents and turbulence in the air stream will cause slider 100 to mechanically vibrate. It is these vibrations that are sense and recorded. Sliders performing non-contact defect detection will typically fly at a height lower than a typical read/write head to ensure any defect high enough to hit the read/write head will be detected and eventually burnished. The lower height also allows more efficient detection and removal of surface defects that might cause data errors or head crashes.

In accordance with one embodiment, a motion detection mechanism, being a non-contact defect detection mechanism, is utilized to detect defects on the surface of disc 124 (FIG. 1). Such a device could be utilized in combination with or in place of glide sensor 962 in FIG. 9. The device could be operatively coupled to controller 120, which could include means for recording defect information and means for controlling in accordance therewith. One example of a motion detector that could be utilized is a piezoelectric crystal that senses flight variations in slider 900 that occur when the slider encounters a disc surface defect during flight. The crystal illustratively could be mounted in several locations within system 110. For instance, the crystal could be mounted, as is known in the art, on slider 900 using a frequency responsive wing. Alternatively, the crystal could be mounted on suspension assembly 116 (FIG. 1). Materials that might incorporated into a motion detection mechanism or glide sensor 962 include but are not limited to PZT, ZnO and AlN.

Since, as was described above, fly height is disc rotation speed (process speed) dependent, the sliders of the above described embodiments that incorporate contact or non-contact defect detectors are capable of being used in the glide mode at a specified glide height. When a defect is sensed, the spindle speed can be reduced to lower a burnish portion to a predetermined burnish fly height in a controlled fashion so as to remove the defect. The spindle could illustratively then be controlled to resume the glide test and burnish when necessary. This procedure will increase the throughput and efficiency of the glide/burnish process.

As has been emphasized, since there are many types of media that could potentially operate in a manner similar to the operation or disc 124, burnish and glide requirements will vary. Typically, the burnish process is designed with respect to an avalanche point whereas the glide process includes strict fly height requirements. The sliders of the above described embodiments can be tailored to target a specifically designated avalanche point or the population of heads can be binned according to fly avalanche characteristics with a high confidence level in repeatability. The air bearing surface design techniques of the above described sliders enable multiple consistent low fly heights that can be selected by varying disc rotation speed. Accordingly, variations in the burnish processes are minimized and glide features can be consolidated.

It is to be noted, as will be demonstrated below, that avalanche and fly data show that the burnish slider embodiments of the present invention that include raised air bearing rails behave significantly different than traditional burnish designs. The railed designs exhibit negative air bearing trends that are useful in loading and unloading procedures. The slider head can be loaded in the landing zone at a low disc rotation speed (RPM) and safely move to the data zone. The RPM can then be increased to the burnish speed, which lowers the burnish head to the desired process flying height. This enables the burnish process to be performed at a higher process speed. A higher process speed not only increases throughput but also, in general, increases flying stability and thus yields.

Figure 10:
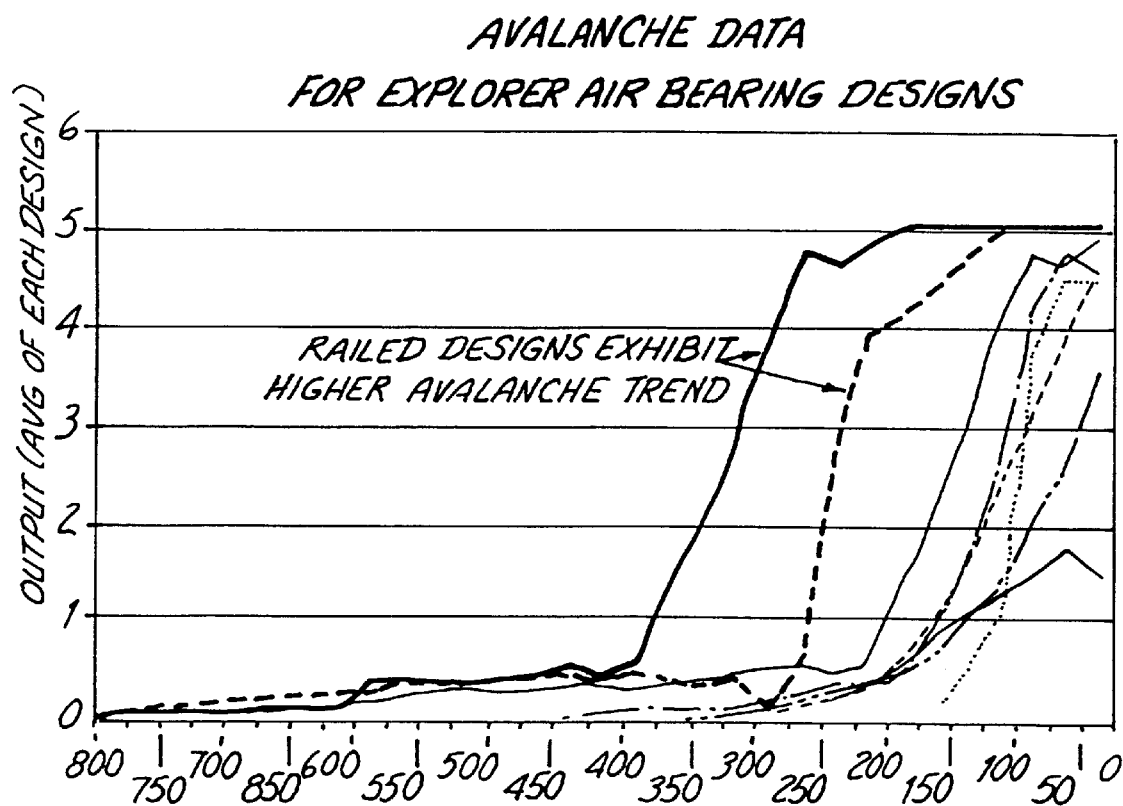
FIG. 10 is a graph depicting avalanche characteristics for different embodiments of the present invention at different process speeds.

Referring now to FIG. 10, a graph depicting avalanche data for different embodiments of the present invention is shown. The graph plots the average output of different aerodynamic feature embodiments versus different disc speeds (different RPM values measured in IPS, inches per second). The data shows that railed burnish heads (L rail and S rail) make contact with the disc at a higher RPM. This result correlates well with the associated fly data discussed below in relation to FIGS. 11 and 12. Contact at a higher RPM is advantageous to the burnish process since the avalanche breakaway point determines the burnish process speed. Effectively, the rail designs enable a disc to be burnished more efficiently at a higher RPM. The graph also shows the effects of different burnish pad configurations on the avalanche point.

Figure 11:
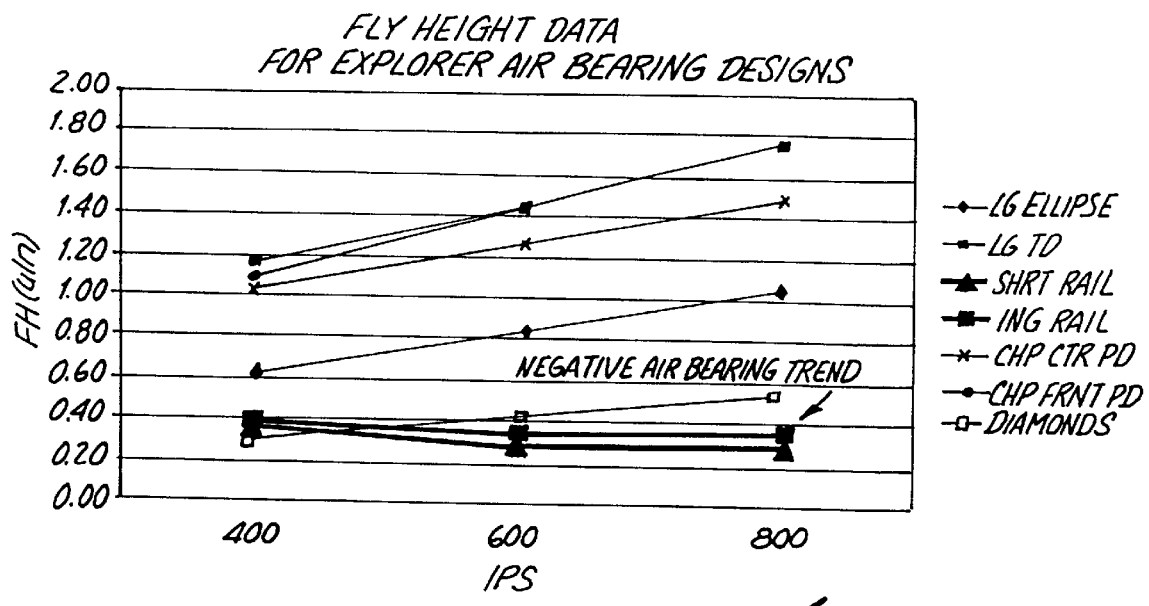
FIG. 11 is a graph depicting fly height characteristics for different embodiments of the present invention at different process speeds.
Figure 12:
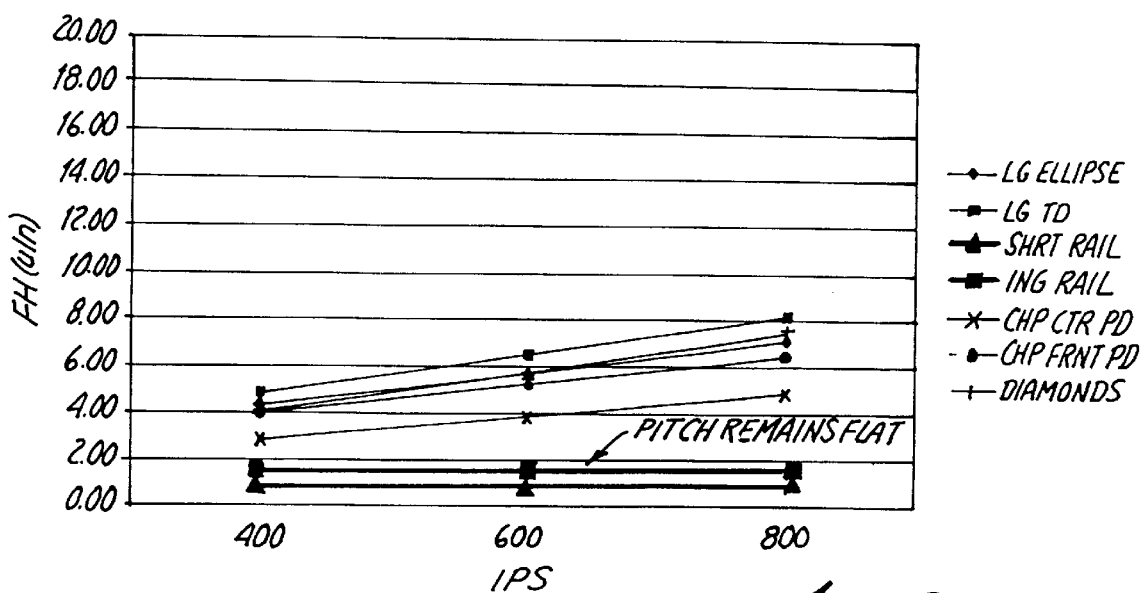
FIG. 12 is a graph depicting slider pitch versus slider speed for different embodiments of the present invention.

Referring now to FIGS. 11 and 12, graphs that depict slider fly characteristics for different embodiments of the present invention are shown. FIG. 11 depicts fly height versus slider speed for different aerodynamic feature embodiments. It should be noted that the railed designs demonstrate a negative air bearing trend. FIG. 12 depicts slider pitch versus slider speed for different embodiments. It should be noted that the railed designs demonstrate a relatively flat flight pitch at various speeds. The charts in FIGS. 11 and 12 also show the effects of different burnish pad configurations on flight characteristics.

In summary, one aspect of the present invention pertains to a disc burnishing system 110 configured to contact and level irregularities located on a surface of a disc 124. System 110 includes a motor 112 to rotate the disc 124 at a desired rate and an armature 116 that carries a burnish slider 100, 200, 300, 400, 500 and 900 over disc 124. Slider 100, 200, 300, 400, 500 and 900 include at least one raised air bearing rail 228, 230, 328, 330, 428, 430, 528, 530, 928 and 930 disposed on and extending from a bottom surface 236, 336, 436, 536 and 936 that faces disc 124. At least one burnish pad 232, 332, 432, 532 and 932 is disposed on bottom surface 236, 336, 436, 536 and 936 and extends towards disc 124. Each burnish pad 232, 332, 432, 532 and 932 is spaced apart from each raised air bearing rail 228, 230, 328, 330, 428, 430, 528, 530, 928 and 930.

Another aspect of the present invention pertains to a burnishing air bearing slider 100, 200, 300, 400, 500 and 900. Slider 100, 200, 300, 400, 500 and 900 includes a slider body 226, 326, 426, 526 and 926 having an upper surface 234 and 334, and a bottom surface 236, 336, 436, 536 and 936 opposed to the upper surface 234 and 334. The bottom surface 236, 336, 436, 536 and 936 includes a length 246 and 346, a longitudinal axis 248, a leading edge 244 and 344 and a trailing edge 242, 342 and 942. First and second rails 228, 230, 328, 330, 428, 430, 528, 530, 928 and 930 are disposed on and extend from the bottom surface 236, 336, 436, 536 and 936 and are substantially symmetrical in their position relative the longitudinal axis 248. Each rail 228, 230, 328, 330, 428, 430, 528, 530, 928 and 930 includes a rail trailing end 250, 254, 350 and 354 offset from the trailing edge 242, 342 and 942 of the bottom surface 236, 336, 436, 536 and 936 and a rail leading end 252, 256, 352 and 356 that substantially coincides with the leading edge 244 and 344 of the bottom surface 236, 336, 436, 536 and 936. The rails 228, 230, 328, 330, 428, 430, 528, 530, 928 and 930 provide an aerodynamic lift to the slider body 226, 326, 426, 526 and 926 in response to air flow under the slider 100, 200, 300, 400, 500 and 900. A plurality of burnish pads 232, 332, 432, 532 and 932 are attached to the bottom surface 236, 336, 436, 536 and 936 and positioned along the length 246 and 346 of the bottom surface 236, 336, 436, 536 and 936, proximate the trailing edge 242, 342 and 942 thereof. The trailing edge 242, 342 and 942 of the bottom surface 236, 336, 436, 536 and 936 corresponds to a distal end 258 and 358 of the slider 100, 200, 300, 400, 500 and 900 and the leading edge 244 and 344 corresponds to a proximal end 260 and 360 of the slider 100, 200 300, 400, 500 and 900. Accordingly, the burnish pads 232, 332, 432, 532 and 932 are positioned substantially distal in location relative the rail trailing ends 250, 254, 350 and 354.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular burnish application while maintaining substantially the same functionality without departing from the scope and spirit of the present invention. In addition, although the preferred embodiment described herein is directed to a hybrid burnish/glide head with advanced air bearing fly height control rails for a disc burnishing system, it will be appreciated by those skilled in the art that the teachings of the present invention can be applied to other types of sliders, such as a positive pressure slider having no cavity dam and sliders having different numbers of rails and rail shapes, without departing from the scope and spirit of the present invention.

What is claimed is:

1. A disc burnishing system configured to contact and level irregularities located on a surface of a disc, comprising:

a motor to rotate the disc;

an armature;

a slider carried on the armature over the surface of the disc, the slider including at least one raised air bearing rail disposed on and extending from a bottom surface that faces the disc; and at least one burnish pad disposed on the bottom surface and extending toward the disc, wherein said at least one burnish pad is spaced apart from said at least one raised air bearing rail.

2. The system of claim 1, wherein said at least one raised air bearing rail is a first rail and a second rail that provide an aerodynamic lift to the slider in response to an air flow under the slider; and wherein the slider has a pitch angle and a height during operation, the height being dependent at least upon a rate at which the motor rotates the disc, the pitch angle being at least dependent upon a shaping of the slider and the first and second rails, and upon an attachment configuration between the slider and the armature, as well as upon the rate at which the motor rotates the disc.

3. The system of claim 2, wherein the bottom surface comprises:

a length, a leading edge and a trailing edge;

wherein the first and second rails each include a rail leading end and a rail trailing end; and wherein the leading edge of the bottom surface approximately coincides with the rail leading ends and wherein the rail trailing ends are offset from the trailing edge of the bottom surface.

4. The system of claim 3, wherein said at least one burnish pad is a plurality of burnish pads positioned along the length of the bottom surface, proximate the trailing edge of the bottom surface.

5. The system of claim 4, wherein the trailing edge of the bottom surface corresponds to a distal end of the slider and the leading edge of the bottom surface corresponds to a proximal end of the slider; and wherein the plurality of burnish pads are positioned in a plurality of locations that are substantially distal in location relative the rail trailing ends.

6. The system of claim 4, wherein the plurality of burnish pads are shaped like teardrops.

7. The system of claim 4, wherein the plurality of burnish pads are shaped like ellipses.

8. The system of claim 4, wherein the plurality of burnish pads are shaped like diamonds.

9. The system of claim 3, wherein the leading edge of the bottom surface and the rail leading ends are tapered.

10. The system of claim 2, wherein the bottom surface further includes a longitudinal axis about which the first and second rails are substantially symmetrical in position.

11. The system of claim 1, further comprising:

a sensor for detecting defects on the surface of the disc, wherein the sensor is operably connected to the slider and extends from the bottom surface thereof.

12. The system of claim 11, wherein the sensor is a piezoelectric pad positioned proximate the trailing edge of the bottom surface; and wherein the piezoelectric pad further includes a substantially flat portion that is positioned substantially flush with the trailing edge of the bottom surface.

13. The system of claim 1, further comprising:

a motion detection mechanism operably disposed relative to the slider and armature;

wherein the motion detection mechanism is configured to detect at least one flight variation that occurs when the slider, as it is carried on the armature over the surface of the disc, encounters a defect on the surface of the disc; and wherein the motion detection mechanism is further configured to produce a signal that corresponds to said at least one flight variation.

14. The system of claim 13, wherein the motion detection mechanism is a piezoelectric crystal.

15. A burnishing air bearing slider, comprising:

a slider body having an upper surface and a bottom surface opposed to the upper surface;

the bottom surface including a length, a longitudinal axis, a leading edge and a trailing edge;

first and second rails disposed on and extending from the bottom surface and substantially symmetrical in their position relative the longitudinal axis;

the first and second rails each including a rail trailing end offset from the trailing edge of the bottom surface and a rail leading end that substantially coincides with the leading edge of the bottom surface, wherein the first and second rails provide an aerodynamic lift to the slider body in response to air flow under the slider;

a plurality of burnish pads attached to the bottom surface and positioned along the length of the bottom surface, proximate the trailing edge thereof; the trailing edge of the bottom surface corresponding to a distal end of the slider and the leading edge of the bottom surface corresponds to a proximal end of the slider; and wherein the plurality of burnish pads are positioned in a plurality of locations that are substantially distal in location relative the rail trailing ends.

16. The slider of claim 15, further comprising:

a sensor for detecting defects on the surface of a disc; and wherein the sensor is operably connected to the slider and positioned on the bottom surface, proximate the trailing edge thereof.

17. The slider of claim 16, wherein the sensor is a piezoelectric pad positioned proximate the trailing edge of the bottom surface; and wherein the piezoelectric pad further includes a substantially flat portion that is positioned substantially flush with the trailing edge of the bottom surface.

18. The slider of claim 15, wherein the leading edge of the bottom surface and the rail leading ends are tapered.

19. The slider of claim 15, further comprising:

a motion detection mechanism operably disposed relative to the slider; and wherein the motion detector is configured to detect at least one flight variation that occurs when the slider encounters a defect during flight and is further configured to produce a signal that corresponds to said at least one flight variation.

* * * * *